(12) United States Patent
Wu et al.

(10) Patent No.: US 12,430,204 B2
(45) Date of Patent: Sep. 30, 2025

(54) END-TO-END DATA PROTECTION FOR COMPUTE IN MEMORY (CIM)/COMPUTE NEAR MEMORY (CNM)

(71) Applicant: Intel Corporation, Santa Clara, CA (US)

(72) Inventors: Wei Wu, Portland, OR (US); Carlos Tokunaga, Hillsboro, OR (US); Gregory K. Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 17/553,623

(22) Filed: Dec. 16, 2021

(65) Prior Publication Data

US 2022/0107867 A1 Apr. 7, 2022

(51) Int. Cl.
*G06F 11/10* (2006.01)
(52) U.S. Cl.
CPC ................ *G06F 11/1068* (2013.01)
(58) Field of Classification Search
CPC ... G06F 11/1068; G06F 11/1048; G06N 3/04; G06N 3/08
See application file for complete search history.

(56) References Cited

U.S. PATENT DOCUMENTS

| 7,555,692 | B1* | 6/2009 | Iacobovici | G06F 11/14 |
| | | | | 708/233 |
| 8,341,473 | B2 | 12/2012 | Bertacco et al. | |
| 8,347,172 | B2* | 1/2013 | Kwon | H03M 13/114 |
| | | | | 714/755 |
| 9,311,050 | B2 | 4/2016 | Olsen | |
| 9,395,952 | B2 | 7/2016 | Olsen | |
| 10,229,065 | B2 | 3/2019 | Kumar et al. | |
| 10,616,669 | B2 | 4/2020 | Kumar et al. | |
| 10,917,321 | B2 | 2/2021 | Schmisseur et al. | |
| 11,210,760 | B2 | 12/2021 | Nurvitadhi et al. | |
| 2011/0154157 | A1* | 6/2011 | Naeimi | H03M 13/2906 |
| | | | | 711/E12.007 |
| 2021/0117249 | A1 | 4/2021 | Doshi et al. | |
| 2024/0338132 | A1* | 10/2024 | Bresniker | G06F 3/0629 |

* cited by examiner

*Primary Examiner* — Cynthia Britt
(74) *Attorney, Agent, or Firm* — Compass IP Law PC

(57) ABSTRACT

A near memory compute system includes multiple computation nodes, such as nodes for parallel distributed processing. The nodes include a memory device to store data and compute hardware to perform a computation on the data. Error correction code (ECC) logic performs ECC on the data prior to computation on the data by the compute hardware. The node also includes residue check logic to perform a residue check on a result of the computation.

21 Claims, 12 Drawing Sheets

TABLE 540

| | DATA OPERATION | RESIDUE OPERATION | RESIDUE CHECK |
|---|---|---|---|
| 542 | $C = A + B$ | $R_C = R_A + R_B = A\%3 + B\%3$ | $R_C == C\%3$ |
| 544 | $C = A * B$ | $R_C = R_A * R_B = A\%3 * B\%3$ | $R_C == C\%3$ |

# END-TO-END DATA PROTECTION FOR COMPUTE IN MEMORY (CIM)/COMPUTE NEAR MEMORY (CNM)

FIELD

Descriptions are generally related to data protection, and more particular descriptions are related to transaction protection for a computation in near memory.

BACKGROUND

Data in computer systems is subject to corruption due to transient errors. There are different protection mechanisms applied in different units to address data errors. In storage units, data is protected by ECC (error correction codes). In computation units, data can be protected by residue codes. ECC codes in storage units are typically applications of Reed Solomon codes, where syndrome-based computations can determine if an error is present in the data. Residue codes perform a residue operation to determine if an error is present in the data.

ECC codes for data storage are fundamentally different in scope and computation from residue codes. Thus, moving data between storage units and computation units traditionally requires decoding and re-encoding to generate the appropriate check bits. The application of both types of data protection has limited impact when the computation units and the storage units have clearly defined boundaries. However, with compute-near-memory (CNM) or compute-in-memory (CIM) systems that have storage and computation integrated together, the application of data protection for the memory unit and for the computation unit has a negative performance impact, adding latency to a critical path, and wasting power.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Figure 1:
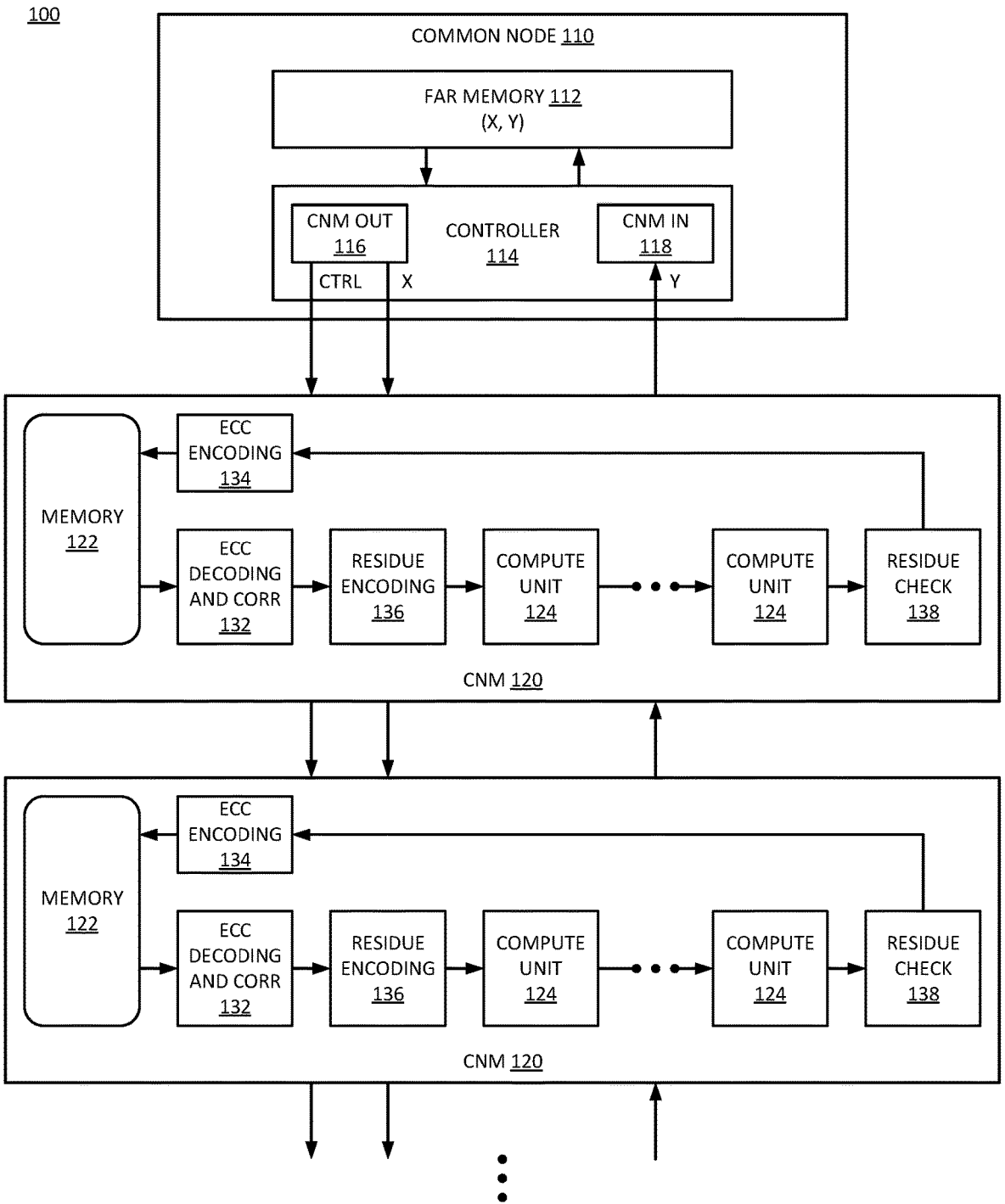
FIG. 1 is a block diagram of an example of a compute near memory system that has ECC and residue checking.

Descriptions of certain details and implementations follow, including non-limiting descriptions of the figures, which may depict some or all examples, and well as other potential implementations.

DETAILED DESCRIPTION

As described herein, a near memory compute system includes multiple computation nodes. In one example, the computation nodes are nodes for parallel distributed processing. The nodes include a memory device to store data and compute hardware to perform a computation on the data. The system can include end-to-end protection, providing protection for the data stored in memory, as well as protection for the computation data. Thus, the data integrity can be ensured along the entire path from near memory, to compute unit, back to near memory. Error correction code (ECC) logic performs ECC on the data prior to computation on the data by the compute hardware. The node also includes residue check logic to perform a residue check on a result of the computation.

In one example, the system includes a two-dimensional (2D) code combining 2D parity and residue code. The 2D code is capable of correcting single bit errors and detecting double bit errors in storage. Additionally, the code detects single bit errors and some multibit errors in computation units. Providing end-to-end data protection for computation near memory with such a code can ensure data integrity with low or minimal impact on power usage or latency along the critical path.

Validating the data stored in memory is based on an assumption that the data sits for a relatively long period of time. Validating computations with a residue check is based on an assumption that the data simply moves through the computation unit. When the data is repeatedly read, computed/changed with a computation, stored, and then read again for more computation, neither assumption is very accurate. End-to-end protection provides protection for the stored data as well as for the computation.

The computation in near memory typically refers to a hierarchy of memory and computation resources. Near memory refers to a memory that is close to a computation resource, while far memory is farther from the computation resource. A memory unit or memory resource that is "close" or "far" from the computation unit is relative based on access latency from the computation unit. Reference to compute near memory (CNM) refers to a hardware device that has a computation resource with a memory resource having an access time that allows the computation unit access to data within a few clock cycles.

It will be understood that general purpose computation units (such as a CPU (central processing unit) or GPU (graphics processing unit)) have a cache or other memory resource co-located with the computation to provide data to the computation core. In such an architecture, the processing core is the primary unit, while the cache supports the processing. Thus, such an architecture has a large, general purpose processing unit with a small support storage unit. CNM generally refers to a memory that has a small, fast, special-purpose compute unit co-located with the memory. Such systems typically operate as accelerators to store data for repeated, specialized computations, such as MAC (multiply-accumulate) operations. CNM can alternatively be referred to as CIM (compute in memory), referring to a memory device that includes the special-purpose computation hardware in it.

CIM and CNM can sometimes be used interchangeably. CNM can be thought of in certain situations as including different memory/compute architectures than a specific memory device with computation hardware. CNM can encompass such a memory with compute hardware in a memory hierarchy, as well as encompassing other compute systems built with specialized compute hardware and a hierarchy of memory. Either architecture can enable acceleration of specialized memory-intensive computations. In either case, the data can be passed between the compute unit and the memory unit quickly, and with low power to enable iterative computations that do not consume system memory bandwidth. The descriptions herein will generally refer to CNM for purposes of example.

FIG. 1 is a block diagram of an example of a compute near memory system that has ECC and residue checking. System 100 provides an example of components of a system that can implement near memory computations with end-to-end data protection. System 100 includes common node 110 and a CNM array, represented by the two CNM units or CNM nodes illustrated.

In one example, common node 110 includes far memory 112, which is a memory resource that has a longer access time than the near memory. Near memory is co-located with the hardware that will perform the computations. Typically, far memory 112 is larger than the near memory. Far memory 112 can store data from multiple CNM nodes.

In one example, far memory 112 is an SRAM (synchronous random access memory) device. In one example, each near memory 122 is an SRAM device. In one example, near memory 122 is a register file of a memory device. In one example, each near memory 122 is a DRAM (dynamic random access memory) device.

In one example, common node 110 includes control circuits and various miscellaneous arithmetic logic, or matrix operation logic, or a combination of arithmetic and matrix logic. The logic can be implemented as standalone hardware or part of a processor or programmable logic array. Controller 114 represents the logic and control circuits. Controller 114 can include interfaces to the CIM or CNM hardware of the CNM array.

CNM OUT 116 represents an interface to provide control (CTRL) and data (X) from far memory 112. Data X from far memory 112 represents one of the operands for the computations to be performed by the CNM array. CNM IN 118 represents an interface to receive data (Y) from the CNM array. Data Y represents the computation result. The data can be stored in far memory 112.

Common node 110 includes a relatively large memory device as far memory 112 for storing X and Y. Near memory 122 is smaller than far memory 112. Controller 114 can be or include one or more control blocks for data communication and access to memories, as well as various arithmetic operations needed to implement the deep neural network (DNN) machine learning. The common-node arithmetic operations can include, but are not limited to, element-wise arithmetic operations, reduction, pooling, non-linearity operations, matrix transposing, data reshaping, compression, or a combination of these, or other operation, depending on the target workloads.

The CNM array includes multiple CNM units or CNM cores, identified as CNM 120. System 100 illustrates the end-to-end protection of data within CNM 120, and does not provide details regarding the computation units. In one example, the computations are matrix computations with MAC units.

CNM 120 includes memory 122 as a near memory. In the configuration of system 100, the system distributes values to near memories 122 at CNM cores of CNMs 120. Memory 122 can store the data and store intermediate computations on the data by compute units 124. CNM 120 can include one or more stages of computation represented by compute unit 124. In one example, compute unit 124 is or includes at least one ALU (arithmetic logic unit). In one example, compute unit 124 is or includes at least one MAC unit.

In one example, CNM 120 includes ECC decoding and correction (CORR) 132 to perform checking and correction of data from memory 122 when it is read for a computation. In one example, CNM 120 includes residue encoding 136 to generate a residue check on the data. After computation on the data, reside check 138 checks the data integrity through compute unit(s) 124. It will be understood that by knowing the computation to perform, and knowing the initial value of the data, residue check 138 can perform an algorithm based on the residue check value generated by residue encoding 136 to determine if an error occurred in the computation. More details are provided below with respect to FIG. 5B.

A typical implementation of ECC has a result that is a bit field, or group of syndrome computations, where each bit in the bit field corresponds to the input codeword. A typical implementation of residue protection has a result that is a value or a number. In one example, a residue computation is a modulo operation, such as a mod 3 or mod 7 operation. The value or number encoded by the residue logic is a residue or remainder of the divide-by-N, where N is the modulo operator.

In one example, CNM 120 includes ECC encoding 134 to encode the computation result prior to writing it back to memory 122. Typically, memory 122 will store the ECC check bits resulting from the ECC encoding computation. ECC decoding and correction 132 can decode the read data as the codeword based on the ECC bits, and perform bit correction when an error is detected.

System 100 represents specific ECC decoding and residue encoding, as well as specific residue checking and ECC encoding. It will be understood that if performed as separate operations, there would be end-to-end protection, but there would be an expectation of a performance impact on the data path. The separation of the operations divides the data processing flow into two domains: a storage oriented domain with memory 122 and the ECC decoding and encoding, and a computation oriented domain with compute unit(s) 124 and the residue encoding and checking. In one example, such as the example of system 200, the residue and ECC operations can be combined instead of performing the operations separately.

While shown separately, in one example, ECC decoding and correction 132 and ECC encoding 134 can be part of the same ECC logic. ECC encoding 134 can encode ECC bits to store for the result of the computation by compute unit 124. ECC decoding and correction 132 can perform ECC on the read data based on the stored ECC check bits.

CNM 120 can represent parallel distributed processing nodes. In one example, one CNM node can pass a computation result to another parallel distributed processing node. Thus, the computation result at one node can be used as an input for the computation by another parallel node. In one example, CNM 120 can store the result of the computation without passing the result to another node. In one example, CNM 120 can store the result of the computation and pass or forward the result to another node. In one example, CNM 120 can forward the result of the computation to another node without storing the result.

CNM refers to a compute near memory resource, in which compute units are integrated right by the memory or very closely to the memory. The compute units located near the memory provides fine-grained distributed compute and memory arrays. Whereas a typical access to memory would send a command and wait for data results at a processing core which performed all computations, certain computations can be made right at the memory with the CNM architecture, reducing the amount of data needed to be transferred from the memory to the processor. Rather, the memory itself has compute resources that can return a result of a computation instead of simply data to be used in a computation.

Near memory 122 includes an array of memory cells or bitcells. In one example, the array is based on a dynamic random access memory (DRAM) technology. In one example, the array is based on a resistive-based random access memory (RAM) cell, such as resistive-RAM (Re-RAM), magnetoresistive RAM (MRAM), ferroelectric RAM (FeRAM), dielectric RAM, or other memory, three dimensional crosspoint (3DXP) phase-change based RAM, or other byte-addressable random access memory technology. In one example, far memory 112 is based on SRAM. In one example, far memory 112 is based on one of the other technologies identified above.

Figure 2:
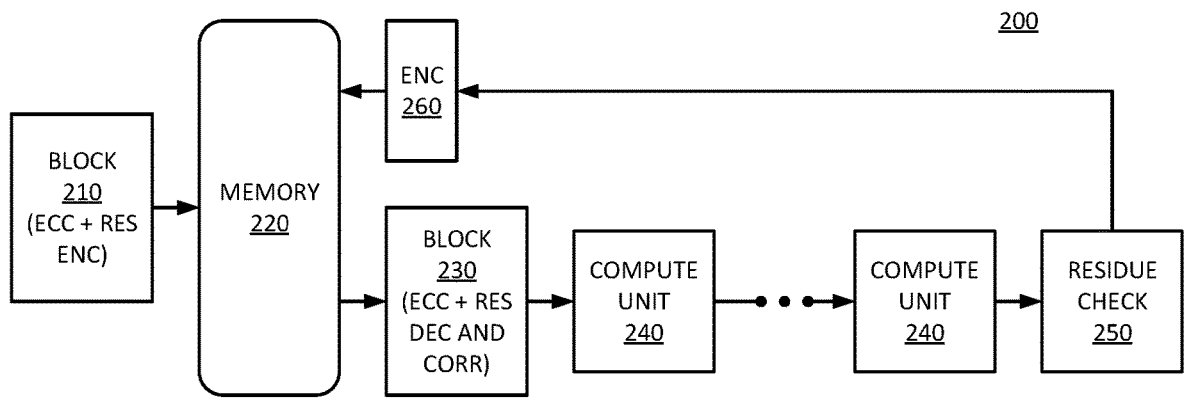
FIG. 2 is a block diagram of an example of end-to-end protection for a compute near memory system.

FIG. 2 is a block diagram of an example of end-to-end protection for a compute near memory system. System 200 represents a CNM node in accordance with an example of system 100. System 200 represents data protection for near memory computing with the data protection operation that merges ECC protection bits and residue checking bits merged into a protection code.

In one example, system 200 represents a computation node for a parallel distributed processing system, such as an example of system 100. In one example, system 200 represents a computation node for a sequential processing system. In a parallel distributed processing system, data is distributed in parallel to multiple CNM computation nodes for computation in parallel. In a sequential processing system, a CNM computation node receives data and performs computations on different data words or chunks of data in sequence.

In one example, the check codes include two vectors of check bits. The residue bits combined with the parity bits provides two layers of protection for the data, one for the data at rest in the memory, and another for the computational data.

In one example, system 200 includes block 210 to calculate the ECC, pre-calculate the residue (residue encoding or RES ENC), and append the residue code bit to the ECC code. By pre-computing the residue and storing it in memory 220, system 200 does not need to be computed again once it is taken out of memory, since it is already computed and stored.

In one example, the ECC code can be a simple parity check instead of a Hamming code. The use of a parity check instead of a Hamming code for ECC can result in a "lightweight" encoding for the end-to-end protection. By combining the ECC check bits and residue codes or residue check bits into one code, system 200 can perform combined data protection for ECC decoding and correction logic as well as residue encoding.

In one example, when data is received from outside system 200, such as from a common control node, block 210 performs full encoding, such as with a Hamming code. After the full encoding, when the data is stored in memory 220, system 200 can perform ECC with the lightweight parity checking.

Thus, block 230 can perform lightweight ECC decoding and residue encoding. In response to detection of an error in the data from memory 220, block 230 can perform error correction (CORR). After decoding of the data protection codes, compute units 240 can perform data computations. After computation by compute units 240, residue check 250 can perform residue checking to ensure the computations executed properly. Residue check 250 can pass the computation result to encoder (ENC) 260, which performs the lightweight encoding on the results to store back to memory 220.

Figure 3A:
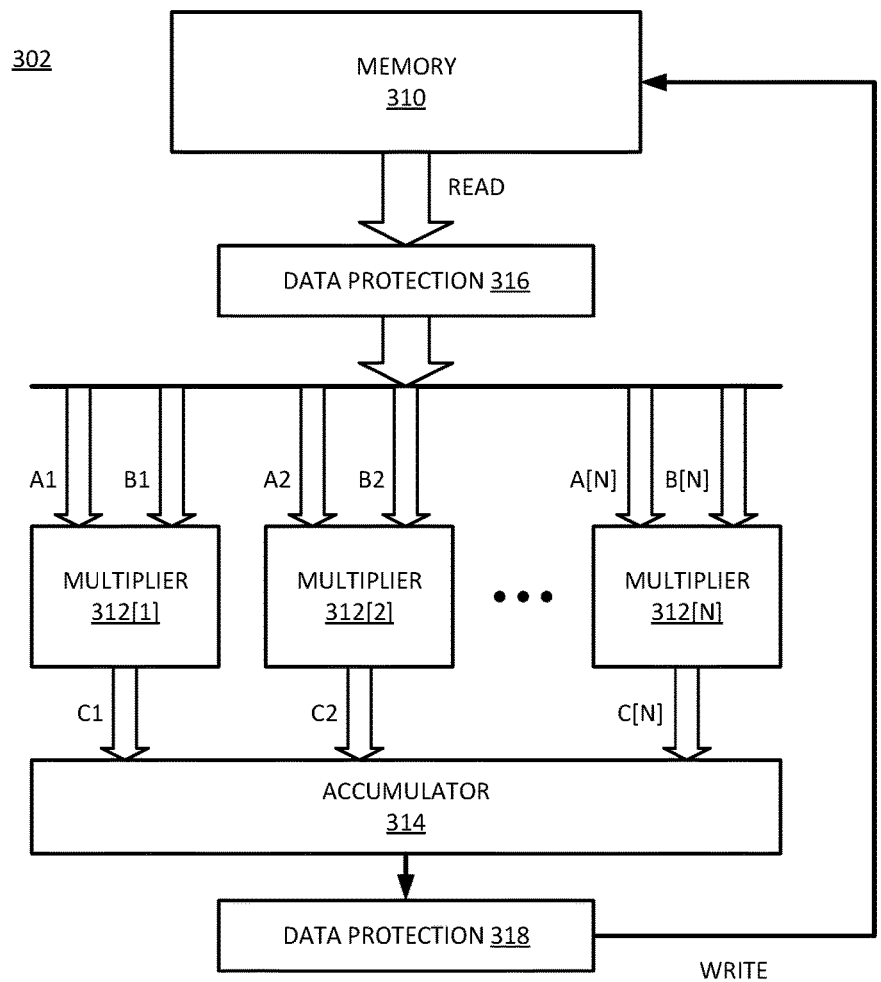
FIG. 3A is a block diagram of an example of a compute architecture for matrix-matrix computations in a CNM core with end-to-end data protection.

FIG. 3A is a block diagram of an example of a compute architecture for matrix-matrix computations in a CNM core with end-to-end data protection. System 302 illustrates a fully distributed structure, where the system provides different portions of data to different compute units. In one example, a read from memory 310 provides data for data protection 316, which represents ECC and residue computations for system 302. System 302 includes N compute units, represented as multiplier 312[1:N], collectively, multipliers 312. While illustrated as multipliers, it will be understood that any computation unit can be used within the architecture of system 302.

The respective multipliers 312 receive data inputs A[1:N] and B[1:N] as operands. Multipliers 312 generate results C[1:N], respectively, with their computations. Thus, multiplier 312[1] receives data A1 and data B1, performs computations, and outputs result C1, multiplier 312[2] receives data A2 and data B2, performs computations, and outputs result C2, and so forth.

System 302 represents a single accumulator 314 that accumulates the partial results of multipliers 312. System 302 could alternatively have separately intermediate results accumulators. Accumulator 314 represents logic to receive and sum the partial results. Accumulator 314 provides the output to data protection 318, which can represent residue checking and ECC check bit computation for storing the results back in memory 310.

Figure 3B:
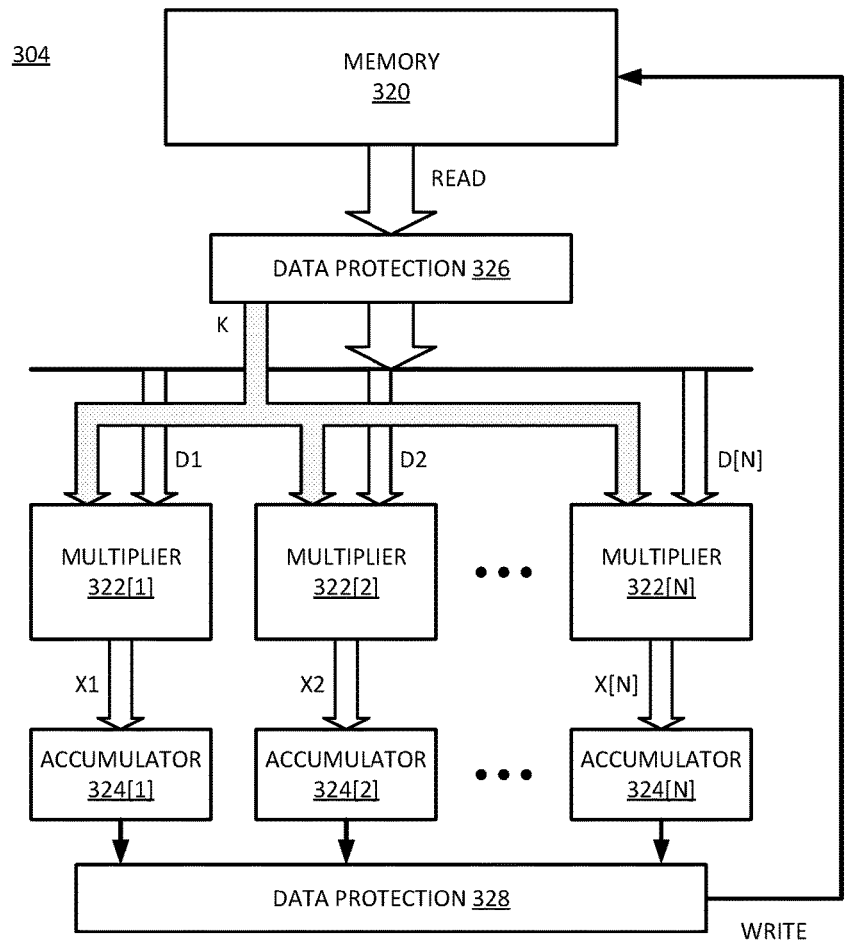
FIG. 3B is a block diagram of an example of a compute architecture for matrix-vector computations in a CNM core with end-to-end data protection.

FIG. 3B is a block diagram of an example of a compute architecture for matrix-vector computations in a CNM core with end-to-end data protection. System 304 illustrates a partially shared structure, where the system provides a shared data element to different compute units. In one example, a read from memory 320 provides data for data protection 326, which represents ECC and residue computations for system 304. System 304 includes N compute units, represented as multiplier 322[1:N], collectively, multipliers 322. While illustrated as multipliers, it will be understood that any computation unit can be used within the architecture of system 304.

The respective multipliers 322 receive data inputs D[1:N] as one operand, and all multipliers 322 receive data input K as the other operand. Multipliers 322 generate results X[1:N], respectively, with their computations. Thus, multiplier 322[1] receives data D1 and K, performs computations, and outputs result X1, multiplier 322[2] receives data D2 and K, performs computations, and outputs result X2, and so forth.

System 304 represents accumulators 324[1:N], collectively accumulators 324, to accumulate the partial results of respective multipliers 322[1:N]. System 304 could alternatively have a single, shared multiplier. Accumulators 324 represent logic to receive and sum the partial results from separate multiplier 322. Accumulators 324 provide the output to data protection 328, which can represent residue checking and ECC check bit computation for storing the results back in memory 320.

Figure 4A:
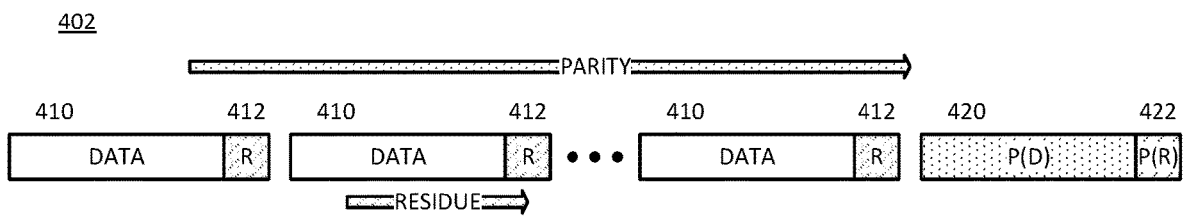
FIG. 4A is a block diagram of an example of a one-dimensional arrangement for protection bits.

FIG. 4A is a block diagram of an example of a one-dimensional arrangement for protection bits. Data 402 represents a bit arrangement of combined ECC and residue codes for a system in accordance with system 100 or system 200.

Data blocks 410 represent M-bit blocks of data with accompanying R bits of residue code 412. Data 402 can include multiple data blocks 410, which can be protected by parity block 420 (P(D)). Parity block 420 includes R bits of residue code 422, represented as P(R), for the residue code for the parity data.

With data 402, parity is computed per bit position of data blocks 410 by a corresponding data bit of parity block 420. The residue is computed per data block 410, with respective residue codes 412 being the code to accompany a specific data block. The residue code bits for parity block 410 is residue parity 422, which can provide a parity check of the residue codes.

Figure 4B:
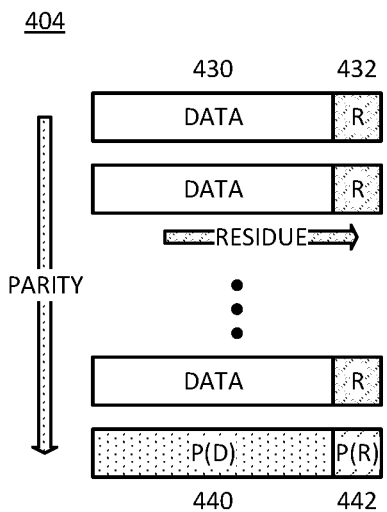
FIG. 4B is a block diagram of an example of a two-dimensional arrangement for protection bits.

FIG. 4B is a block diagram of an example of a two-dimensional arrangement for protection bits. Data 404 represents a bit arrangement of combined ECC and residue codes for a system in accordance with system 100 or system 200. Data 404 is arranged as a two-dimensional code for clarity. Data 404 can be the same data as data 402.

Data blocks 430 represent M-bit blocks of data with accompanying R bits of residue code 432. Data 404 can include multiple data blocks 430, which can be protected by parity block 440 (P(D)). Parity block 440 includes R bits of residue code 442, represented as P(R), for the residue code for the parity data.

With data 404, the x-dimension is the data and residue. The y-dimension is the parity. Data 404 provides a visual understanding of how parity can be computed in the y-dimension for each bit position of data blocks 430, including residue codes 432, to corresponding bits of parity block 440 and its residue parity bits 442. Each residue code 432 provides protection in the x-dimension for a respective data block 430.

Figure 4C:
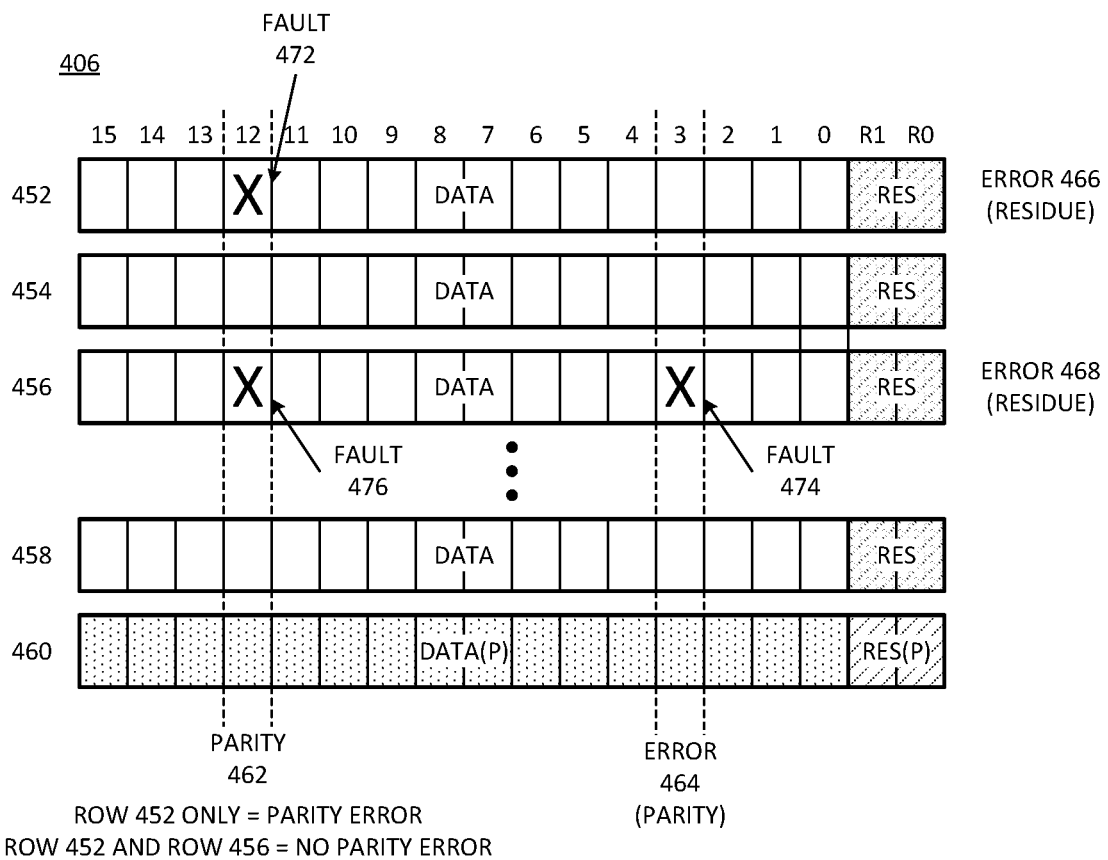
FIG. 4C is a block diagram of an example of data protection with a two-dimensional arrangement for protection bits.

FIG. 4C is a block diagram of an example of data protection with a two-dimensional arrangement for protection bits. Data 406 is a 2D bit arrangement for data bits, ECC or parity bits, and residue bits or a residue check value as a two-dimensional array. The 2D array can be the data stored in near memory. Data 406 can be an example of data 402 or data 404.

Data 406 can have multiple rows of data bits with associated residue check values, and a row having parity bits, including residue check value parity bits. Row 452, row 454, row 456, and row 458 represent rows of data with their associated residue bits. Data 406 specifically illustrates an example with 16 bits of data (DATA[15:0]) with a mod3 residue value having bits R1 and R0. The specific length of 16 bits is merely one example, and any length of data word will work. Similarly, a 2-bit residue value is one example, and 3-bit (modulo 7), or other residue value will work.

Data 406 illustrates row 460 with parity bits or ECC bits (DATA(P)[15:0]), with residue parity bits RES(P)[1:0]. Row 460 includes a parity bit with each bit location to indicate parity for a column made up of the corresponding bits positions of the rows of data bits. For example, bit position 12 includes DATA[12] for all of rows 452, 454, 456, . . . , 458. The value in row 460 DATA[12] indicates parity for the data bits in position DATA[12] for all rows.

The 2D code represented by data 406 can correct any 1b (single bit) errors and detect all 2b (double bit) errors. Thus, data 406 provides SECDED (single error correct double error detect) protection. Simple examples can illustrate.

First consider a single-bit fault (a flipped bit) in row 452, DATA[12] as the only error in data 406, identified as fault 472. When parity 462 is computed, the parity computation will not match, resulting in a parity error. Additionally, the flipped bit will result in error 466 as a residue error for row 452. The parity error and the residue error can specifically identify the error in row 452, allowing the ECC correction to flip DATA[12] of row 452.

Now consider a double-bit fault, with flipped bits in row 452, DATA[12] (fault 472) and row 456, DATA[3] (fault 474). When parity 462 is computed, the parity computation will not match, resulting in a parity error for bit position 12. Additionally, the flipped bit will result in error 466 as a residue error for row 452. The flipped bit in row 456, DATA[3] will cause error 464 in bit position 3 when the parity is computed. Additionally, the second flipped bit will result in error 468 as a residue error for row 456. In one example, the combination of parity errors and residue errors can specifically identify the errors in both rows, allowing the ECC correction to flip the appropriate data bits.

Now consider a double-bit fault, with fault 472, and a flipped bit at row 456, DATA[12] (fault 476). When parity 462 is computed, the parity computation will match, because there are two faults in bit position 12, resulting in no parity error. Although the parity error will not detect the faults, fault 472 will result in error 466 as a residue error for row 452, and fault 476 will result in error 468 as a residue error for row 456. Even though the error checking will register no parity error, the correction can detect two blocks of data having bit errors. Thus, the system can detect the two-bit error even though it cannot specifically identify the errors to be able to correct them.

Figures 5A, 5B:
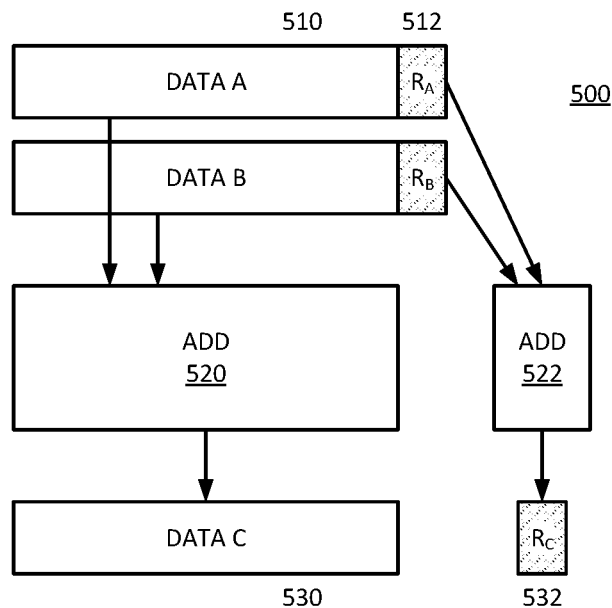
FIG. 5A is a block diagram of an example of residue arithmetic logic.
FIG. 5B is a table illustrating an example of the residue arithmetic of FIG. 5A.

FIG. 5A is a block diagram of an example of residue arithmetic logic. Logic 500 represents the residue computation logic. Logic 500 represents a general layout of the logic, without specifying the bits values. For purposes of example, logic 500 is described below with reference to specific bit values.

Consider data blocks 510 with corresponding residue codes 512. Data A has residue code $R_A$, and data B has residue code $R_B$. As one example, data blocks 510 can be 16-bit data values with 2-bit residue codes, where the residue encoding is a divide-by-3 logic, with a result having 2 bits equal to 00, 01, or 10. If the result is equal to or greater than 3, it will be divided-by-3 and reduced to two bits.

Logic 500 includes arithmetic logic, represented by ADD 520. Alternatively, the arithmetic logic could be a multiplier. In one example, logic 500 includes an additional residue arithmetic logic unit, represented by ADD 522. The residue arithmetic logic unit can be an adder or a multiplier, depending on the arithmetic logic unit that will operate on data A and data B.

In logic 500, the output of ADD 520 is data C, which is data block 530. The output of ADD 522 is residue code 532 or residue code $R_C$. In one example, the residue operation is closed under data arithmetic logic unit. Thus, even if there are multiple computing units, the residue bits can be passed along with the data. In one example, the residue check is performed at the end.

FIG. 5B is a table illustrating an example of the residue arithmetic of FIG. 5A. Table 540 illustrates row 542 for an addition operation and row 544 for a product (multiply) operation. In row 542, the data operation is C=A+B, which is a simple addition operation. In one example, the corresponding residue operation is $R_C = R_A R_B = A \%3 + B \%3$, or the residue is the sum of A mod 3 plus B mod 3. The residue check is $R_C == C \%3$, or C mod 3, which is checked against the result of $R_A + R_B$.

In row 544, the data operation is C=A*B, which is a simple multiply operation. In one example, the corresponding residue operation is $R_C = R_A * R_B = A \%3 * B \%3$, or the residue is the product of A mod 3 times B mod 3. The residue check is $R_C == C \%3$, or C mod 3, which is checked against the result of $R_A * R_B$.

Figure 6A:
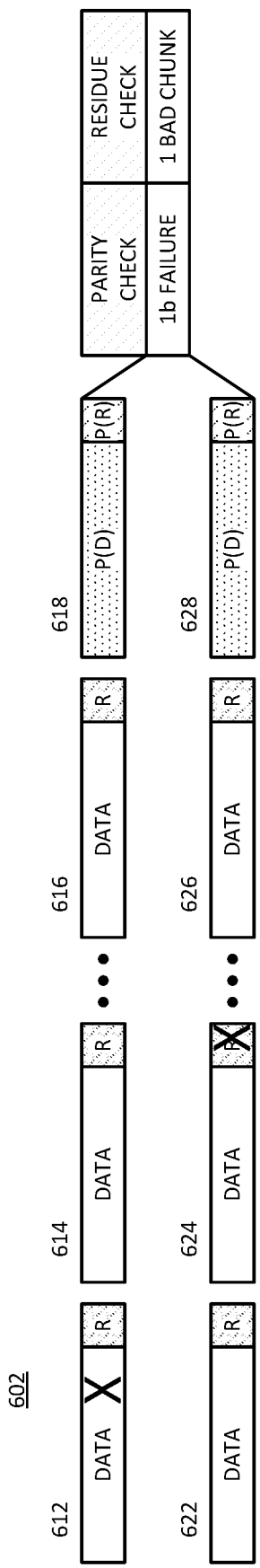
FIG. 6A is a block diagram of an example of residue check and parity check on data with a one-bit failure.

FIG. 6A is a block diagram of an example of residue check and parity check on data with a one-bit failure. Data 602 represents data protection for the row of data blocks combined with residue check values. Data block 612, data block 614, and data block 616 are protected by parity block 618. Consider a fault in the data portion of data block 612, as represented by the 'X'. Such a scenario will result in a parity check 1b failure and a residue check indicating 1 bad chunk of data, data block 612. The parity check shows a 1-bit mismatch, and the residue check provides location information.

Data block 622, data block 624, and data block 626 are protected by parity block 628. Consider a fault in the residue portion of data block 624, as represented by the 'X'. Such a scenario will result in a parity check 1b failure and a residue check indicating 1 bad chunk of data, data block 624. The parity check shows a 1-bit mismatch, and the residue check provides location information.

Figure 6B:
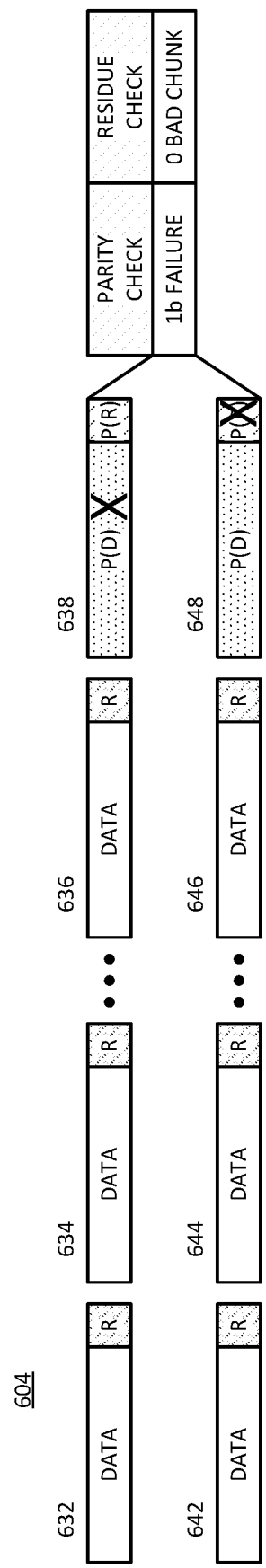
FIG. 6B is a block diagram of an example of residue check and parity check on data with a one-bit failure in the parity bits.

FIG. 6B is a block diagram of an example of residue check and parity check on data with a one-bit failure in the parity bits. Data 604 represents data protection for the row of data blocks combined with residue check values. Data block 632, data block 634, and data block 636 are protected by parity block 638. Consider a fault in parity block 638 corresponding to the data bits, as represented by the 'X'. Such a scenario will result in a parity check 1b failure and a residue check indicating 0 bad chunks of data because the parity block is not involved in a computation.

Data block 642, data block 644, and data block 646 are protected by parity block 648. Consider a fault in the residue portion of parity block 648, as represented by the 'X'. Such a scenario will result in a parity check 1b failure and a residue check indicating 0 bad chunks of data because the parity block is not involved in a computation.

Figure 7A:
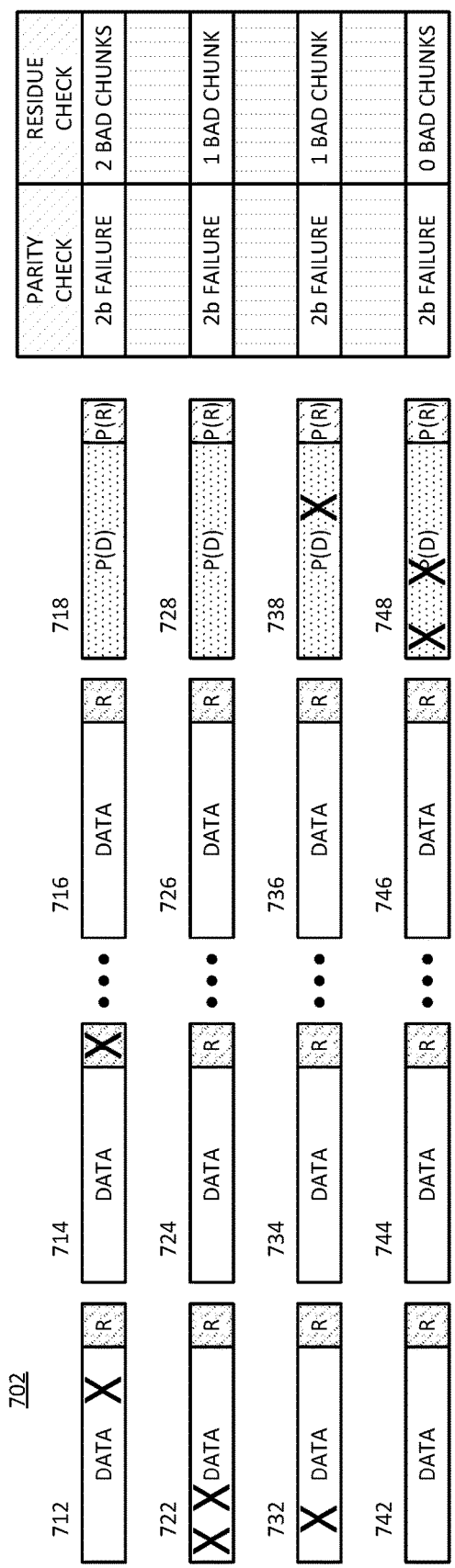
FIG. 7A is a block diagram of an example of residue check and parity check on data with a two-bit failure.

FIG. 7A is a block diagram of an example of residue check and parity check on data with a two-bit failure. Data 702 represents data protection for the row of data blocks combined with residue check values. With data 702, the system will detect 2-bit failures, with different results on determining the location of the fault based on the residue check.

Data block 712, data block 714, and data block 716 are protected by parity block 718. Consider faults in the data portion of data block 712 and the residue portion of data block 714, as represented by the marks. Such a scenario will result in a parity check 2b failure and a residue check indicating 2 bad chunks of data.

Data block 722, data block 724, and data block 726 are protected by parity block 728. Consider two faults in the data portion of data block 722, as represented by the marks. Such a scenario will result in a parity check 2b failure and a residue check indicating 1 bad chunk of data, data block 722.

Data block 732, data block 734, and data block 736 are protected by parity block 738. Consider faults in the data portion of data block 732 and in the data portion of parity block 738, as represented by the marks. Such a scenario will result in a parity check 2b failure and a residue check indicating 1 bad chunk of data, data block 732, because parity block 738 will not register as a residue fault.

Data block 742, data block 744, and data block 746 are protected by parity block 748. Consider two faults in the data portion of parity block 748, as represented by the marks. Such a scenario will result in a parity check 2b failure and a residue check indicating 0 bad chunks of data, as a bit error in parity block 748 does not register a residue fault.

Figure 7B:
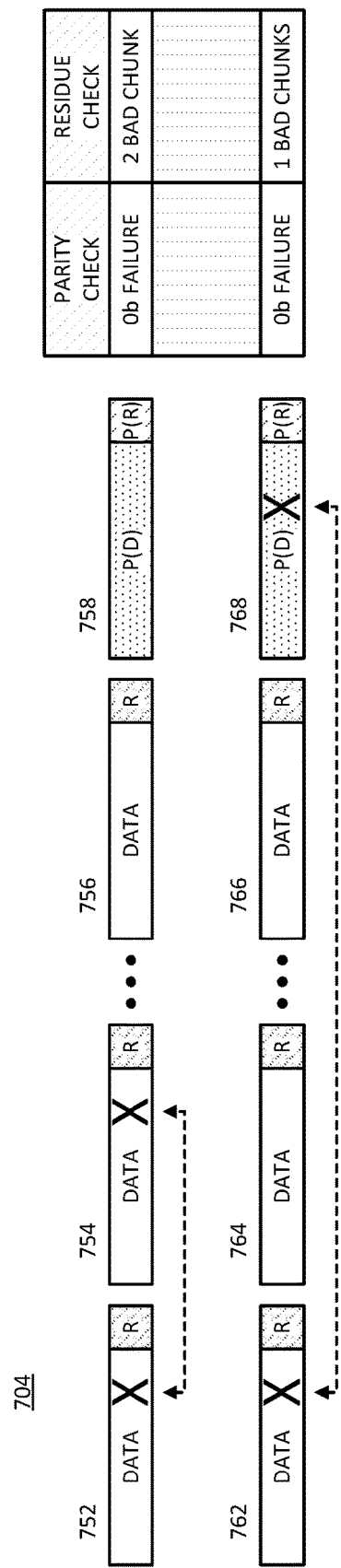
FIG. 7B is a block diagram of an example of residue check and parity check on data with a two-bit failure that evades parity error detection.

FIG. 7B is a block diagram of an example of residue check and parity check on data with a two-bit failure that evades parity error detection. Data 704 represents data protection for the row of data blocks combined with residue check values. With data 704, the system will not detect bit failures, but can detect residue errors.

Data block 752, data block 754, and data block 756 are protected by parity block 758. Consider faults in the data portion of data block 752 and in the data portion of data block 754, as represented by the marks. When the errors are in the same bit position, as indicated by the dashed line, the even number of errors in the same bit position does not change the parity calculation. Such a scenario will result in a parity check of 0b failure and a residue check indicating 2 bad chunks of data. As such, the system can detect the 2-bit error.

Data block 762, data block 764, and data block 766 are protected by parity block 768. Consider faults in the data portion of data block 762 and in the data portion of parity block 768, as represented by the marks. When the errors are in the same bit position, as indicated by the dashed line, the flipped bit in the parity block will flip the parity check preventing detection of a single bit error in the column. Such a scenario will result in a parity check of 0b failure and a residue check indicating 1 bad chunks of data. As such, the system can detect the 2-bit error.

Figure 8:
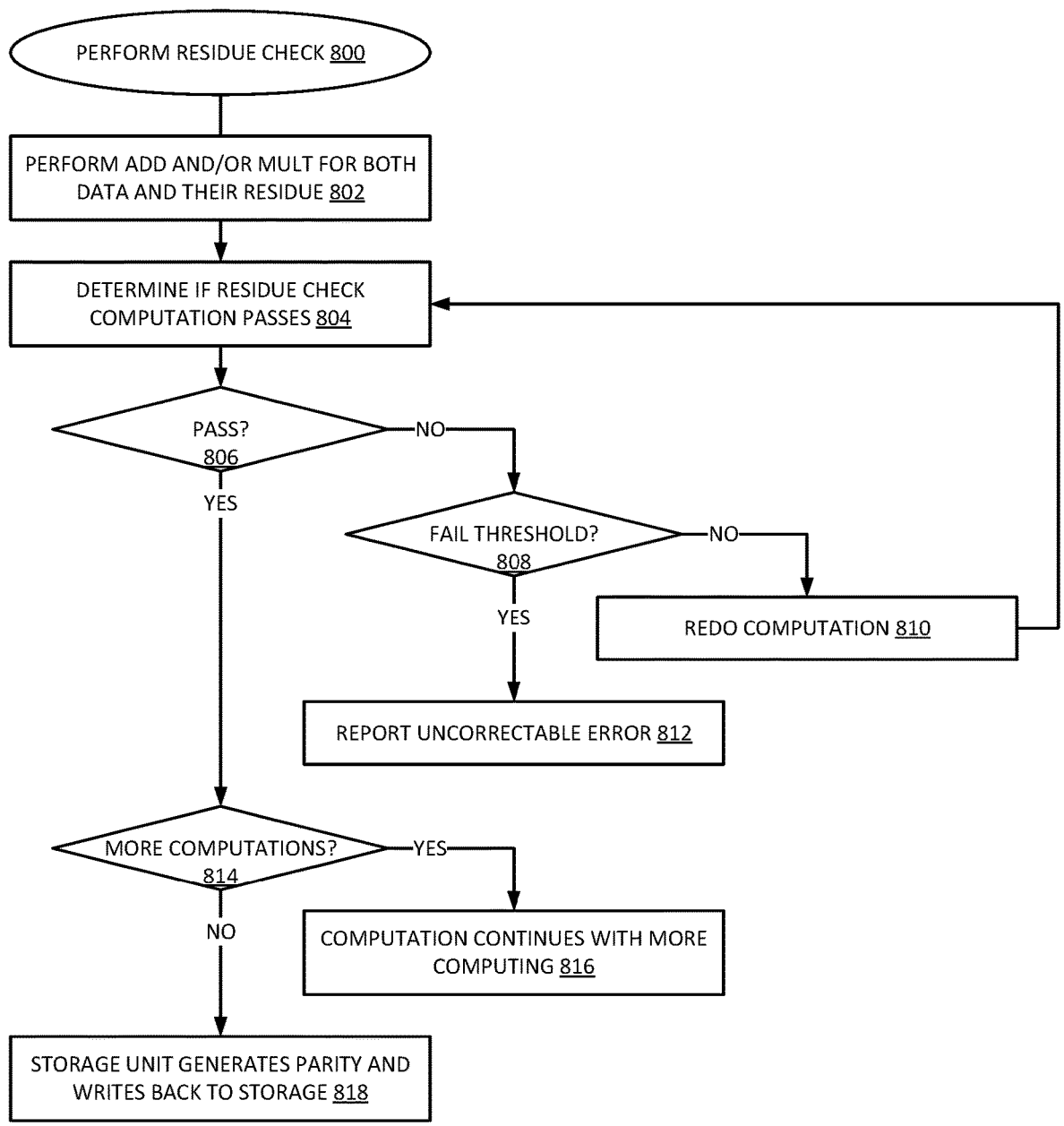
FIG. 8 is a flow diagram of an example of a process for performing residue checking in a compute near memory system.

FIG. 8 is a flow diagram of an example of a process for performing residue checking in a compute near memory system. Process 800 represents a process to perform a residue check and the handling of any mismatch detected.

In one example, a CNM system performs an arithmetic operation such as an add or a multiply or both an add and a multiply for both data and the residue codes of the data chunks, at 802. In one example, the system determines if the residue check computation passes, at 804. If the residue check computation does not pass, at 806 NO branch, the system can determine if the residue check has failed a threshold number of times.

A detected fault may be caused by a soft error, where performing the computation again can often resolve the issue. However, if the error persists after a threshold number of times (e.g., 3 times), it might indicate a more serious error, such as a stuck-bit fault. Thus, in one example, if the fail threshold has been reached, at 808 YES branch, the system will report an uncorrectable error, at 812. If the fail threshold is not reached, at 808 NO branch, the system can redo the computation, at 810. After redoing the computation, the system can again determine if the residue check computation passes, at 804.

In one example, if the residue check computation passes, at 806 YES branch, the system determines if there are more computations to perform. If there are more computations to perform, at 814 YES branch, the system continues the computations with more computing, at 816. In one example, if there are no more computations to perform, at 814 NO branch, the storage unit generates a parity computation and write the data and parity back to storage, at 818.

Figure 9:
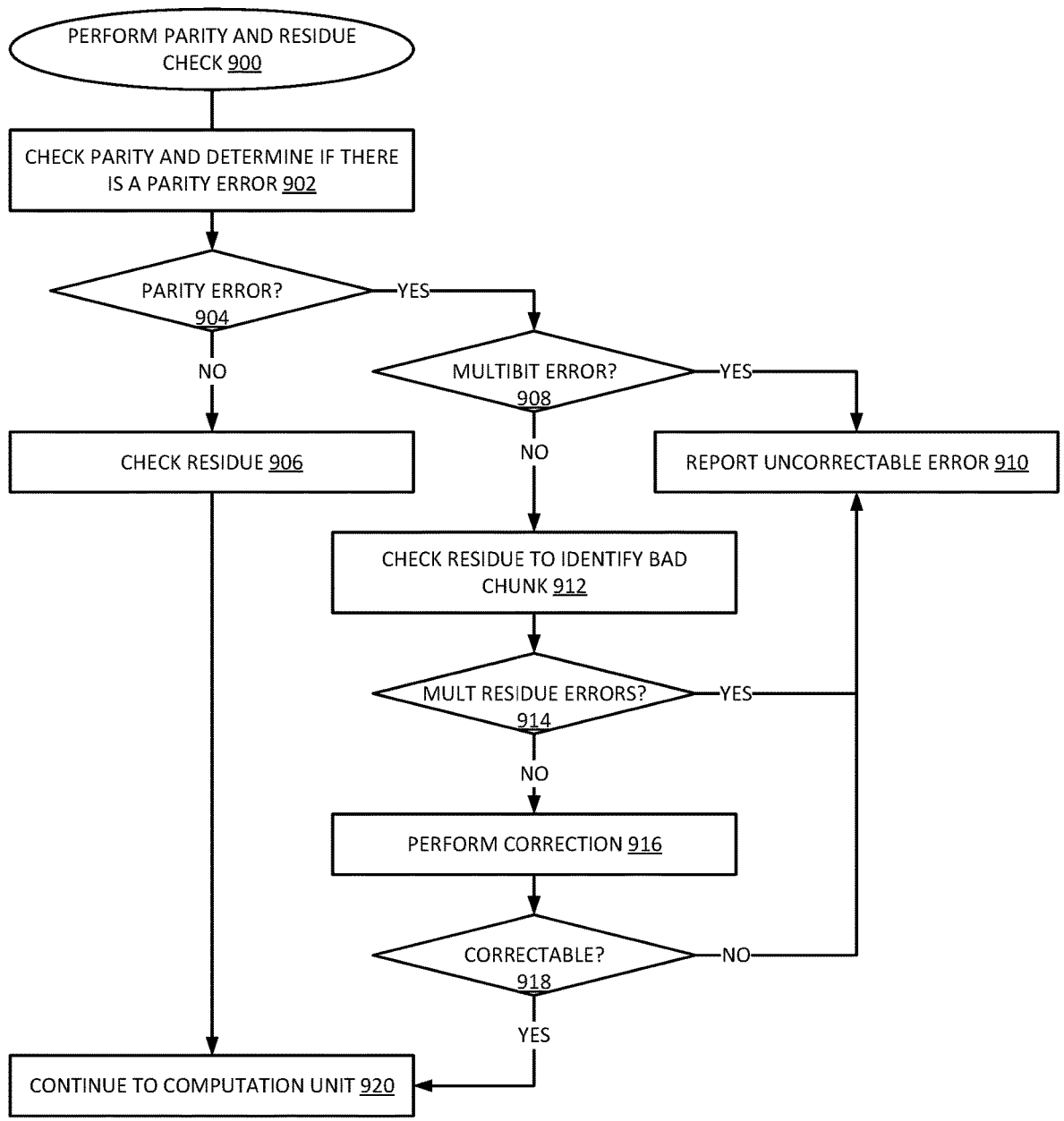
FIG. 9 is a flow diagram of an example of a process for performing 2D parity and residue checking in a compute near memory system.

FIG. 9 is a flow diagram of an example of a process for performing 2D parity and residue checking in a compute near memory system. Process 900 represents a process to perform 2D parity and residue checking.

In one example, the system checks parity and determines if there is a parity error, at 902. If there is no parity error, at 904 NO branch, the system checks residue, at 906. In one example, if there is a parity error, at 904 YES branch, the system can determine whether the error is a multibit error.

If the error is a multibit error, at 908 YES branch, in one example, the system reports an uncorrectable error, at 910. If the error is a multibit error, at 908 NO branch, the system can check the residue to identify bad chunks of data, at 912. In one example, if there are multiple residue errors detected, at 914 YES branch, the system reports an uncorrectable error, at 910.

In one example, if there are not multiple residue errors are detected, at 914 NO branch, meaning there is only a single residue error or no residue errors, the system can perform correction of the errors, at 916. The detected errors can be identified based on the residue error detection.

In one example, if the error is not correctable, at 918 NO branch, the system reports an uncorrectable error, at 910. In one example, if the error is correctable, at 918 YES branch, the system continues to the computation unit, at 920. After checking the residue, at 906, the system can continue to the computation unit, at 920. In one example, continuing with the computation can include sending the computation result to a parallel distributed processing node. The parity checking and the residue checking can be performed separately or simultaneously. In process 900, they are illustrated in sequential order, but they can be performed in parallel.

Figure 10:
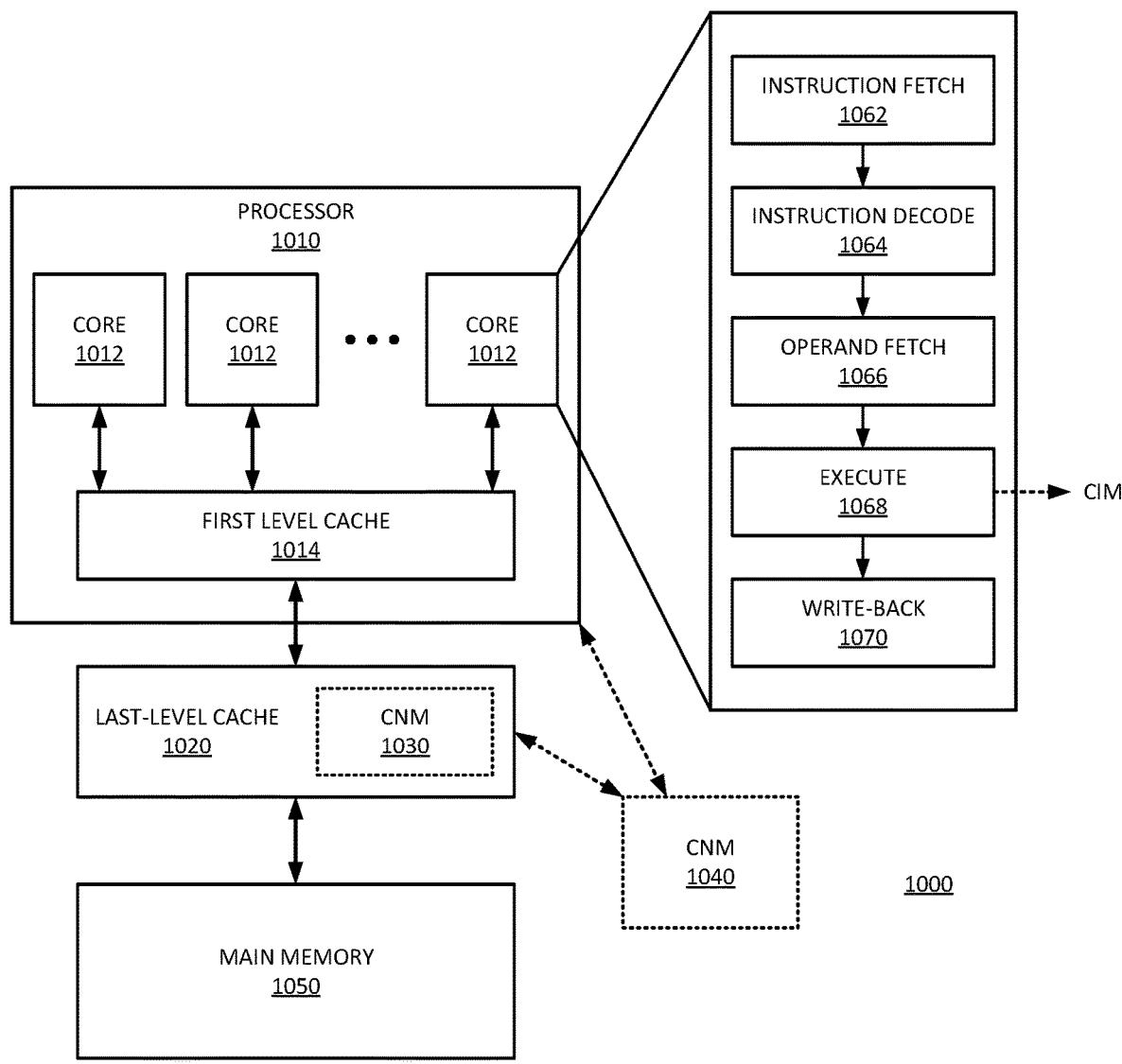
FIG. 10 is a block diagram of an example of a system with a processor and compute-in memory or compute near-memory circuitry with residue and parity checking.

FIG. 10 is a block diagram of an example of a system with a processor and compute-in memory or compute near-memory circuitry with residue and parity checking. System 1000 can include a CNM circuit with end-to-end data protection in accordance with any example above. The CNM circuit can be a CNM accelerator for machine learning or other compute-intensive operation. An accelerator can be referred to as a coprocessor or accelerator hardware or accelerator engine.

System 1000 includes processor 1010, which can be or include a general purpose CPU (central processing unit), a GPU (graphics processing unit), a DSP (digital signal processor) array, or other processor. Processor 1010 represents a digital processor and can be referred to as a host processor. In one example, processor 1010 includes multiple cores 1012. Processor 1010 executes applications or software programs that access data for compute-intensive operations.

In one example, processor 1010 includes first level cache 1014, which represents caching resources within the processor die or processor SOC (system on a chip) that provides physically close storage resources for hot data. In one example, processor 1010 includes multiple levels of on-chip/local cache, which are not explicitly shown. It will be understood that cache resources can be local to a specific core 1012, shared by multiple cores 1012, or a combination of shared cache resources and localized cache resources.

System 1000 includes last-level cache 1020. In one example, last level cache 1020 is also on processor 1010. In one example, last level cache 1020 is off-chip from processor 1010. Last level cache 1020 is larger than first level cache 1014 but takes longer to access. There may be any number of other cache layers between first level cache 1014 and last level cache 1020.

Main memory 1050 represents system main memory. Main memory 1050 is typically orders of magnitude larger than the cache resources, but takes much longer to access relative to the cache resources. Main memory 1050 can include volatile memory resources that have indeterminate state when power is interrupted. Main memory 1050 can include nonvolatile memory resources that maintain state even when power is interrupted to the memory. Caching resources are typically volatile, but can include nonvolatile memory resources.

System 1000 includes a depiction of an instruction execution pipeline for core 1012. In one example, each core 1012 can include multiple execution pipelines (e.g., multithreading). The instruction pipeline is to be understood as a general explanation, and specific details are not provided. In one example, the instruction pipeline includes instruction fetch 1062 where the core fetches the instruction to execute. Instruction decode 1064 represents the decoding of the instruction by the core in preparation of the processor circuitry for execution. In one example, instruction decode 1064 identifies the instruction as part of a command that triggers use of a CNM circuit for operation.

Operand fetch 1066 represents the fetching or obtaining of the operands to be executed on for the instruction. In one example, the operand is a weight vector for a neural network, or other math function operand. In one example, the operands are in or are placed in register space associated with the execution pipeline. Execute 1068 represents execution of the instruction on or with the operand(s). In one example, execution can include sending of the operation to CNM circuitry for execution. In one example, the instruction is sent to a processor ALU (arithmetic logic unit), which can trigger the execution by the CNM accelerator. Write-back 1070 refers to writing execution results in a results register for return to memory, or for passing to another register for another execution. In the case of use of CNM circuitry, execution 1068 and write-back 1070 can include sending the operation to CNM circuitry, which will execute the operation and return a functional output, which can then be written back. The execution can include configuration of the CNM circuitry in accordance with any example described herein. Thus, the instruction that would traditionally require loading operands into an ALU or other computation engine within processor 1010 can be sent to the CNM circuitry without having to read from memory, and then receiving a computation result from the CNM circuitry instead of from the local computation engine.

CNM 1030 represents CNM circuitry implemented in last level cache 1020. CNM 1030 can be all or part of last level cache 1020. In one example, last level cache 1020 includes a memory array configured as a CNM circuit, and a memory array that does not include CNM circuitry. The system can selectively store data in the CNM-enabled memory array for CNM acceleration.

CNM 1040 represents CNM circuitry that is separate from the cache architecture of system 1000. Thus, CNM 1040 represents a memory resource that is dedicated to the execution of CNM accelerated operations. Such a CNM memory can still include traditional access hardware to enable reading from the memory without performing a computation. CNM 1030 and CNM 1040 include CNM hardware to enable functional reads in accordance with any example described herein.

CNM 1030 and CNM 1040 include access paths from processor 1010. When part of the cache architecture as CNM 1030, the interconnection hardware can be the same as interconnection hardware for the cache devices. When not part of the cache architecture as CNM 1040, the CNM interconnection can be similar or the same as a cache device, or main memory device, or other memory coupled to processor 1010. CNM 1030 and CNM 1040 are coupled to main memory 1050 (not specifically shown) to load operands for CNM acceleration operations.

In one example, invocation of a compute-intensive function triggers directing commands to the CNM accelerator. For example, processor 1010 can include support in its instruction set architecture (ISA) for certain commands to trigger operation of a CNM accelerator. In one example, invocation of the CNM accelerator can be preceded by or associated with the loading of configuration information into accelerator. Such configuration information can, for example, define weights of internodal connections, define math functions to be performed, or other configuration. System 1000 can load configuration information from system main memory or from nonvolatile mass storage, or a combination.

In one example, the CNM circuitry of either CNM 1030 or CNM 1040, or both, can include combined ECC checking or parity checking and residue codes. Based on storing combined check bits and residue codes, the system can perform end-to-end data protection.

Figure 11:
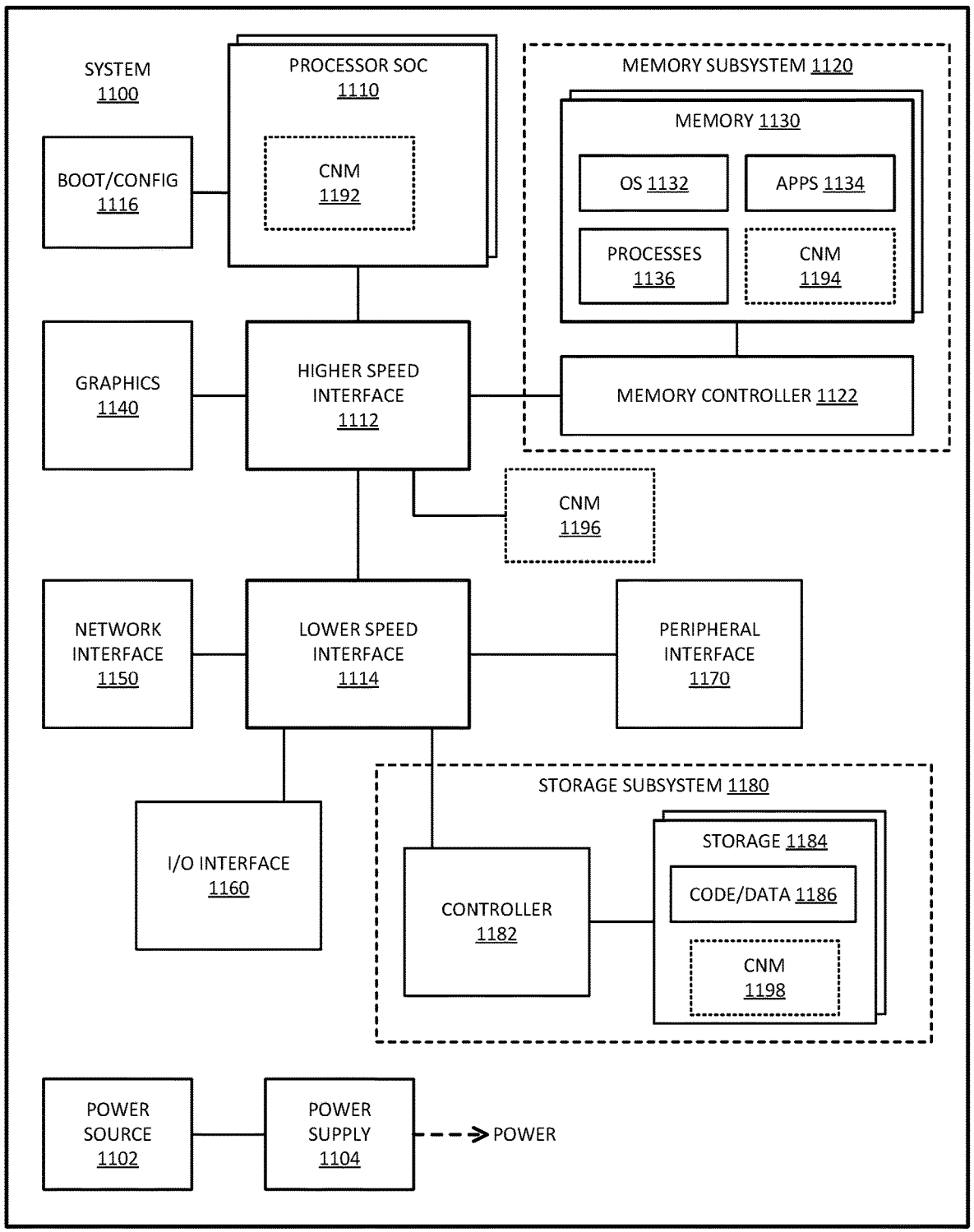
FIG. 11 is a block diagram of an example of a computing system in which compute-in memory or compute near-memory circuitry with residue and parity checking can be implemented.

FIG. 11 is a block diagram of an example of a computing system in which compute-in memory or compute near-memory circuitry with residue and parity checking can be implemented. System 1100 represents a computing device in accordance with any example herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

In one example, system 1100 includes CNM circuitry. The CNM circuitry includes combined ECC checking or parity checking and residue codes in accordance with any example described herein. Based on storing combined check bits and residue codes, the system can perform end-to-end data protection. One example of CNM circuitry can be CNM 1192, which is represented as CNM circuitry included in processor SOC 1110. CNM 1192 can be or include CNM circuitry in a memory device on the processor SOC substrate or die. For example, CNM 1192 can be part of a cache on processor SOC 1110. Another example of CNM circuitry can be CNM 1194, which is represented as CNM circuitry included in memory subsystem 1120. More specifically, CNM 1194 is illustrated as part of memory 1130, referring to the memory resources of system 1100. CNM 1194 represents CNM circuitry that can be included as a memory resource to which processor SOC 1110 can offload compute-intensive operations while providing data protection.

Another example of CNM circuitry can be CNM 1196, which represents hardware coupled to processor SOC 1110 to provide CNM computations for system 1100. Such hardware could be considered an accelerator or a special purpose hardware. Examples can include a dedicated accelerator circuit, an FPGA (field programmable gate array) with memory, an ASIC (application specific integrated circuit) having memory and compute resources, or other hardware. Another example of CNM circuitry can be CNM 1198 in storage 1180. CNM 1198 can be CNM circuitry in a disk or nonvolatile storage resource in system 1100. Such a resource can read and write directly to the nonvolatile storage, or can include volatile storage or cache memory for computations, which then is stored to the nonvolatile storage. Hard drives typically include a buffer or other volatile memory that can be paired with CNM circuitry.

System 1100 includes processor SOC 1110 (referred to subsequently as "processor 1110"), which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 can include a single core or multiple cores. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

System 1100 includes boot/config 1116, which represents storage to store boot code (e.g., basic input/output system (BIOS)), configuration settings, security hardware (e.g., trusted platform module (TPM)), or other system level hardware that operates outside of a host OS. Boot/config 1116 can include a nonvolatile storage device, such as read-only memory (ROM), flash memory, or other memory devices.

In one example, system 1100 includes interface 1112 coupled to processor 1110, which can represent a higher speed interface or a high throughput interface for system components that needs higher bandwidth connections, such as memory subsystem 1120 or graphics interface components 1140. Interface 1112 represents an interface circuit, which can be a standalone component or integrated onto a processor die. Where present, graphics interface 1140 interfaces to graphics components for providing a visual display to a user of system 1100. In one example, graphics interface 1140 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Memory subsystem 1120 represents the main memory of system 1100, and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 1100 includes interface 1114, which can be coupled to interface 1112. Interface 1114 can be a lower speed interface than interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can exchange data with a remote device, which can include sending data stored in memory or receiving data to be stored in memory.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (i.e., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (i.e., the value or state of the data is indeterminate if power is interrupted to system 1100). In one example, storage subsystem 1180 includes controller 1182 to interface with storage 1184. In one example controller 1182 is a physical part of interface 1114 or processor 1110, or can include circuits or logic in both processor 1110 and interface 1114.

Power source 1102 provides power to the components of system 1100. More specifically, power source 1102 typically interfaces to one or multiple power supplies 1104 in system 1100 to provide power to the components of system 1100. In one example, power supply 1104 includes an AC to DC (alternating current to direct current) adapter to plug into a wall outlet. Such AC power can be renewable energy (e.g., solar power) power source 1102. In one example, power source 1102 includes a DC power source, such as an external AC to DC converter. In one example, power source 1102 or power supply 1104 includes wireless charging hardware to charge via proximity to a charging field. In one example, power source 1102 can include an internal battery or fuel cell source.

Figure 12:
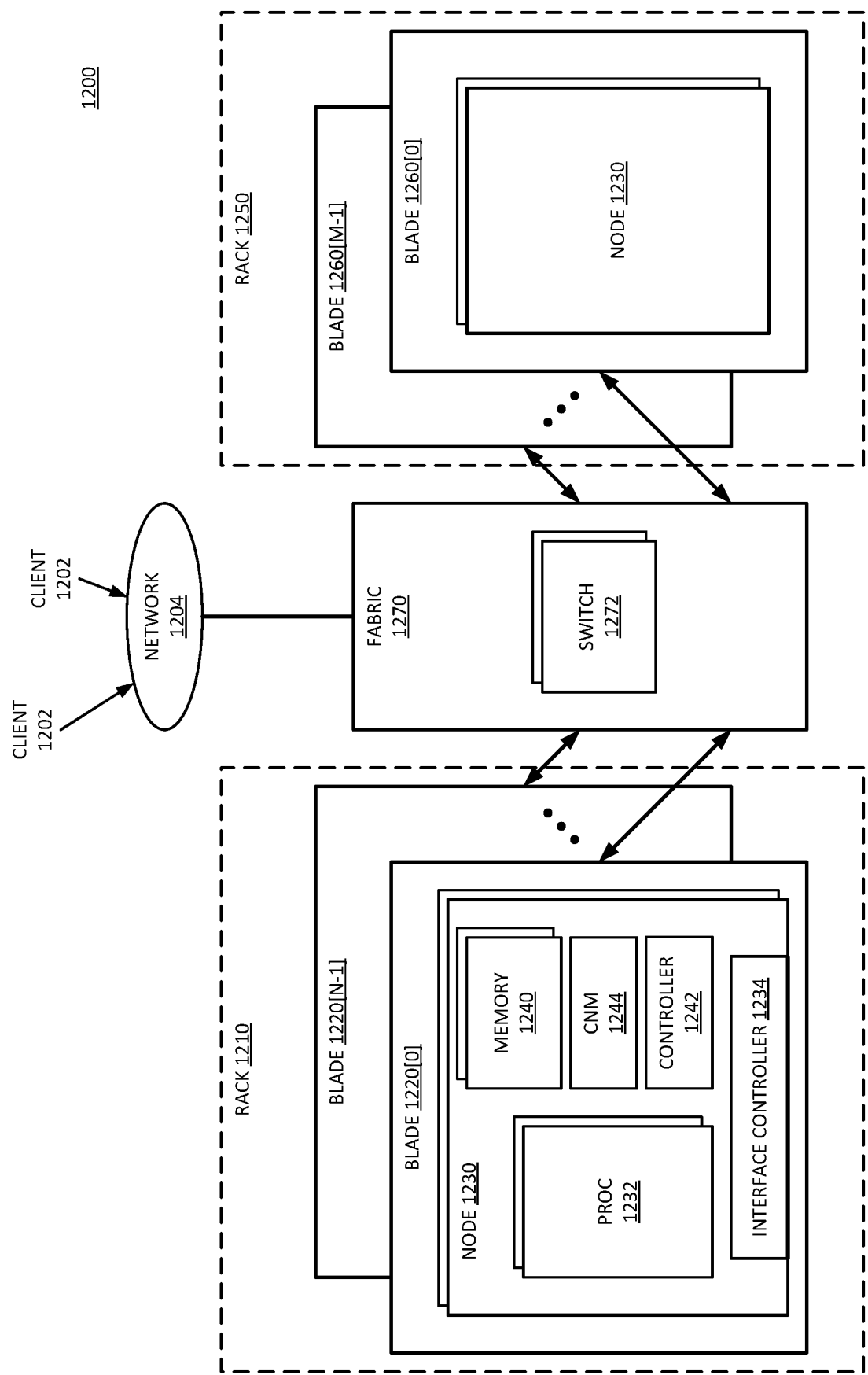
FIG. 12 is a block diagram of an example of a multi-node network in which compute-in memory or compute near-memory circuitry with residue and parity checking can be implemented.

FIG. 12 is a block diagram of an example of a multi-node network in which compute-in memory or compute near-memory circuitry with residue and parity checking can be implemented. System 1200 represents a network of nodes in accordance with any example described herein. In one example, system 1200 represents a data center. In one example, system 1200 represents a server farm. In one example, system 1200 represents a data cloud or a processing cloud.

Node 1230 includes memory 1240, which in one example includes CNM 1244. CNM 1244 includes combined ECC checking or parity checking and residue codes in accordance with any example described herein. Based on storing combined check bits and residue codes, the system can perform end-to-end data protection. Processor 1232 can offload compute-intensive operations to while providing data protection.

One or more clients 1202 make requests over network 1204 to system 1200. Network 1204 represents one or more local networks, or wide area networks, or a combination. Clients 1202 can be human or machine clients, which generate requests for the execution of operations by system 1200. System 1200 executes applications or data computation tasks requested by clients 1202.

In one example, system 1200 includes one or more racks, which represent structural and interconnect resources to house and interconnect multiple computation nodes. In one example, rack 1210 includes multiple nodes 1230. In one example, rack 1210 hosts multiple blade components 1220. Hosting refers to providing power, structural or mechanical support, and interconnection. Blades 1220 can refer to computing resources on printed circuit boards (PCBs), where a PCB houses the hardware components for one or more nodes 1230. In one example, blades 1220 do not include a chassis or housing or other "box" other than that provided by rack 1210. In one example, blades 1220 include housing with exposed connector to connect into rack 1210. In one example, system 1200 does not include rack 1210, and each blade 1220 includes a chassis or housing that can stack or otherwise reside in close proximity to other blades and allow interconnection of nodes 1230.

System 1200 includes fabric 1270, which represents one or more interconnectors for nodes 1230. In one example, fabric 1270 includes multiple switches 1272 or routers or other hardware to route signals among nodes 1230. Additionally, fabric 1270 can couple system 1200 to network 1204 for access by clients 1202. In addition to routing equipment, fabric 1270 can be considered to include the cables or ports or other hardware equipment to couple nodes 1230 together. In one example, fabric 1270 has one or more associated protocols to manage the routing of signals through system 1200. In one example, the protocol or protocols is at least partly dependent on the hardware equipment used in system 1200.

As illustrated, rack 1210 includes N blades 1220. In one example, in addition to rack 1210, system 1200 includes rack 1250. As illustrated, rack 1250 includes M blades 1260. M is not necessarily the same as N; thus, it will be understood that various different hardware equipment components could be used, and coupled together into system 1200 over fabric 1270. Blades 1260 can be the same or similar to blades 1220. Nodes 1230 can be any type of node and are not necessarily all the same type of node. System 1200 is not limited to being homogenous, nor is it limited to not being homogenous.

For simplicity, only the node in blade 1220[0] is illustrated in detail. However, other nodes in system 1200 can be the same or similar. At least some nodes 1230 are computation nodes, with processor (proc) 1232 and memory 1240. A computation node refers to a node with processing resources (e.g., one or more processors) that executes an operating system and can receive and process one or more tasks. In one example, at least some nodes 1230 are server nodes with a server as processing resources represented by processor 1232 and memory 1240. A storage server refers to a node with more storage resources than a computation node, and rather than having processors for the execution of tasks, a storage server includes processing resources to manage access to the storage nodes within the storage server.

In one example, node 1230 includes interface controller 1234, which represents logic to control access by node 1230 to fabric 1270. The logic can include hardware resources to interconnect to the physical interconnection hardware. The logic can include software or firmware logic to manage the interconnection. In one example, interface controller 1234 is or includes a host fabric interface, which can be a fabric interface in accordance with any example described herein.

Processor 1232 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1240 can be or include memory devices (such as memory 1240) and a memory controller (such as controller 1242).

In general with respect to the descriptions herein, in one example an apparatus includes: a memory of a computation node, the memory to store data; compute hardware of the computation node, to perform a computation on the data; error correction code (ECC) logic to perform ECC on the data prior to computation with a code that includes both ECC bits and residue check bits; and residue check logic to perform a residue check on a result of the computation with the residue check bits of the code.

In one example of the apparatus, the memory is to store ECC bits for the data, wherein the ECC logic is to perform ECC on the data with the ECC bits from the memory. In accordance with any preceding example of the apparatus, in one example, the memory is to store a residue check value, wherein the residue check logic is to perform the residue check on the result of the computation with the residue check value. In accordance with any preceding example of the apparatus, in one example, the residue check value comprises a modulo value of the data. In accordance with any preceding example of the apparatus, in one example, the result of the computation is to be stored back in the memory. In accordance with any preceding example of the apparatus, in one example, the ECC logic is to encode ECC bits to store for the result of the computation. In accordance with any preceding example of the apparatus, in one example, the memory is to store the data, ECC bits, and a residue check value, where the ECC bits and residue check value represent a two-dimensional array. In accordance with any preceding example of the apparatus, in one example, the memory is to store multiple rows having data bits and associated residue check values, and a row having parity bits, with a parity bit of a bit location to indicate parity for a column made up of the rows of data bits in the bit location or a column made up of the rows of bits in the bit location. In accordance with any preceding example of the apparatus, in one example, the computation node comprises a node of a parallel distributed processing system having multiple parallel distributed processing nodes. In accordance with any preceding example of the apparatus, in one example, the result of the computation is to be forwarded to another parallel distributed processing node.

In general with respect to the descriptions herein, in one example a computer system includes: a host processor; and accelerator hardware coupled to the host processor, to receive a request for parallel distributed processing, the accelerator hardware including multiple processing nodes, wherein an individual processing node includes: a memory to store data; a compute unit to perform a computation on the data; error correction code (ECC) logic to perform ECC on the data prior to computation with a code that includes both ECC bits and residue check bits; and residue check logic to perform a residue check on a result of the computation with the residue check bits of the code.

In one example of the computer system, the memory is to store a residue check value, wherein the residue check logic is to perform the residue check on the result of the computation with the residue check value. In accordance with any preceding example of the computer system, in one example, the ECC logic is to encode ECC bits to store for the result of the computation. In accordance with any preceding example of the computer system, in one example, the memory is to store the data, ECC bits, and a residue check value as a two-dimensional array. In accordance with any preceding example of the computer system, in one example, the result of the computation is to be forwarded from one node to another. In accordance with any preceding example of the computer system, in one example, the computer system includes a multicore host processor; a display communicatively coupled to the host processor; or a network interface communicatively coupled to the host processor.

In general with respect to the descriptions herein, in one example a method for computation, comprising: storing data in a memory of a computation node; performing a computation on the data with compute hardware of the computation node; performing Error Correction Code (ECC) on the data prior to performing the computation with a code that includes both ECC bits and residue check bits; and performing a residue check on a result of the computation with the residue check bits of the code.

In one example of the method, performing the residue check comprises performing the residue check on the result of the computation with a residue check value stored in the memory. In accordance with any preceding example of the method, in one example, the method includes encoding ECC bits to store in the memory for the result of the computation. In accordance with any preceding example of the method, in one example, the method includes: storing in the memory the data, ECC bits, and a residue check value as a two-dimensional array. In accordance with any preceding example of the method, in one example, the computation node comprises a node of a parallel distributed processing system having multiple parallel distributed processing nodes, and further comprising: forwarding the result of the computation to another parallel distributed processing node.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
 a memory of a computation node, the memory to store data;
 compute hardware of the computation node, to perform a computation on the data;
 error correction code (ECC) logic to perform ECC decoding and correction on the data prior to computation with a code that includes both ECC bits and residue check bits; and
 residue check logic to perform a residue check on a result of the computation with the residue check bits of the code.

2. The apparatus of claim 1, wherein the memory is to store ECC bits for the data, wherein the ECC logic is to perform the ECC decoding and correction on the data with the ECC bits from the memory.

3. The apparatus of claim 1, wherein the memory is to store a residue check value, wherein the residue check logic is to perform the residue check on the result of the computation with the residue check value.

4. The apparatus of claim 3, wherein the residue check value comprises a modulo value of the data.

5. The apparatus of claim 1, wherein the result of the computation is to be stored back in the memory.

6. The apparatus of claim 5, wherein the ECC logic is to encode ECC bits to store for the result of the computation.

7. The apparatus of claim 5, wherein the memory is to store the data, ECC bits, and a residue check value, where the ECC bits and residue check value represent a two-dimensional array.

8. The apparatus of claim 7, wherein the memory is to store multiple rows having data bits and associated residue check values, and a row having parity bits, with a parity bit of a bit location to indicate parity for a column made up of the rows of data bits in the bit location or a column made up of the rows of bits in the bit location.

9. The apparatus of claim 1, wherein the computation node comprises a node of a parallel distributed processing system having multiple parallel distributed processing nodes.

10. The apparatus of claim 9, wherein the result of the computation is to be forwarded to another parallel distributed processing node.

11. A computer system, comprising:
 a host processor; and accelerator hardware coupled to the host processor, to receive a request for parallel distributed processing, the accelerator hardware including multiple processing nodes, wherein an individual processing node includes:
- a memory to store data;
- a compute unit to perform a computation on the data;
- error correction code (ECC) logic to perform ECC decoding and correction on the data prior to computation with a code that includes both ECC bits and residue check bits; and
- residue check logic to perform a residue check on a result of the computation with the residue check bits of the code.

12. The computer system of claim 11, wherein the memory is to store a residue check value, wherein the residue check logic is to perform the residue check on the result of the computation with the residue check value.

13. The computer system of claim 11, wherein the ECC logic is to encode ECC bits to store for the result of the computation.

14. The computer system of claim 11, wherein the memory is to store the data, ECC bits, and a residue check value as a two-dimensional array.

15. The computer system of claim 11, wherein the result of the computation is to be forwarded from one node to another.

16. The computer system of claim 11, including one or more of:
- wherein the host processor comprises a multicore processor;
- a display communicatively coupled to the host processor; or
- a network interface communicatively coupled to the host processor.

17. A method for computation, comprising:
- storing data in a memory of a computation node;
- performing a computation on the data with compute hardware of the computation node;
- performing error correction code (ECC) decoding and correction on the data prior to performing the computation with a code that includes both ECC bits and residue check bits; and
- performing a residue check on a result of the computation with the residue check bits of the code.

18. The method of claim 17, wherein performing the residue check comprises performing the residue check on the result of the computation with a residue check value stored in the memory.

19. The method of claim 17, further comprising:
- receiving the result of the computation; and
- encoding ECC bits from the result to store in the memory for the result of the computation.

20. The method of claim 17, further comprising:
- storing in the memory the data, ECC bits, and a residue check value as a two-dimensional array.

21. The method of claim 17, wherein the computation node comprises a node of a parallel distributed processing system having multiple parallel distributed processing nodes, and further comprising:
- forwarding the result of the computation to another parallel distributed processing node.

* * * * *